May 15, 1951  G. L. FREEMAN  2,552,951
DISK TYPE MOWER
Filed Nov. 8, 1945  2 Sheets-Sheet 1

Inventor
G. L. Freeman
By Arthur H. Sturges
Attorney

Patented May 15, 1951

2,552,951

UNITED STATES PATENT OFFICE 2,552,951

DISK TYPE MOWER

Garland L. Freeman, Nickerson, Nebr.

Application November 8, 1945, Serial No. 627,446

2 Claims. (Cl. 56—25.4)

The present invention relates to grass and weed cutters, lawn mowers and the like.

It is an object of the invention to provide a mower for fence lines which is so constructed and the parts thereof so cooperatively arranged and assembled with respect to each other that the device will shear heavy strands of grass, weeds, comparatively heavy undergrowths and the like along fence lines and close to fence posts without injury to the mechanism.

Another object of the invention is to provide a device for the above stated purposes which is so constructed that in the event the revolving cutters thereof fractionate snarled wire, such as often becomes lost or abandoned and disposed along fence lines adjacent the boundaries of farms and highways, that said fractions or clippings of wire are prevented from impinging against the feet and ankles of an operator during use of the new device.

A further object of the invention is to provide a particular mounting for the revolvable cutters of the new device and in a manner whereby said blades may be readily detached from their carrying rotor for replacement or sharpening purposes.

A still further object of the invention is to provide a mechanism such that comparatively thick and fibrous stalks of weeds may be as readily severed as blades of grass.

Another object of the invention is to provide an upwardly arched rotor bar for supporting swingable cutters on each end thereof, said bar being so constructed and so shaped that it does not contact with grass or weed stubbles during operation, whereby less power is required for rotating the bar and cutters during use.

A further object of the invention is to so pivotally hinge the cutters thereof that centrifugal force throws them outwardly into operative position during use while at the same time said cutters are yieldable in the event that they contact a solid object such as a fence post or the like, whereby said cutters do not become broken nor unduly dulled.

Another object of the invention is to provide cutters having serrated cutting edges, the latter being arcuate in plan for presenting the serrations of each cutter successively to the work in a manner whereby each cutter operates similar to a saw for severing the tough fibers of weed stalks and the like.

Other and further objects and advantages of the invention will be understood from the following detailed description thereof.

Figure 1:
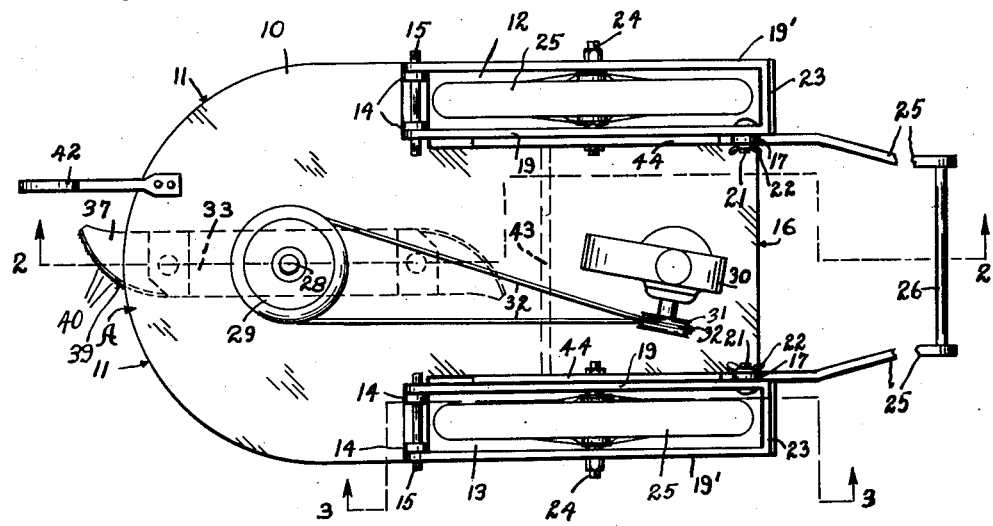
Figure 1 is a top plan view of the new mower.

Referring now to the drawings for a more particular description and first to Figure 1, the mower of the present invention includes a platform 10 which is elongated in plan, having a forward arcuate edge 11 which is semi-elliptical in plan for purposes later described.

Figure 2:
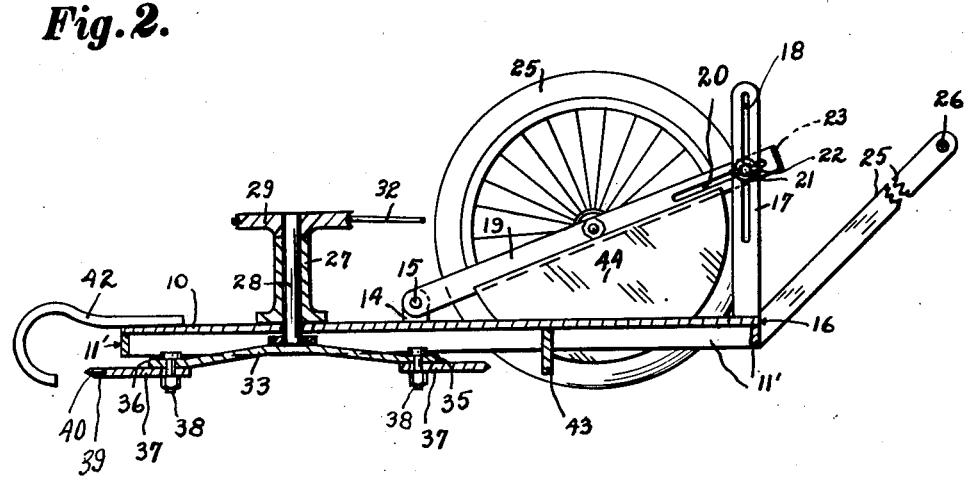
Figure 2 is a longitudinal vertical section taken substantially on line 2—2 of Figure 1.

The platform 10 is formed of a sheet of material of suitable thickness, the edges of the said sheet being welded to a frame 11', the latter being best shown in Figure 2. The frame 11' is of the same contour, in plan, as the platform 10.

As best shown in Figure 1, the platform 10 is provided with oppositely disposed elongated like recesses or notches 12 and 13 disposed inwardly of the side edges respectively of the platform 10 for purposes later described.

Adjacent to the forward ends of the recesses 12 and 13, a pair of spaced apart ears 14 are provided for each recess. The ears are welded to the upper side of the platform 10.

Each pair of ears provides a mounting for a pivot pin 15.

Adjacent the rear edge 16 of the platform 10, oppositely disposed like standards 17 are provided. Adjacent the upper ends of the standards each is provided with an elongated opening 18. The lower ends of the standards are secured to the platform 10 and are disposed at a right angle thereto.

A pair of oppositely disposed hanger-bars or yokes 19 are provided, the forward ends thereof each being pivotally attached to one of the pins 15, as best shown in Figure 1. The rear ends of the hanger-bars 19 are each provided with an elongated slot 20. Bolts 21 are disposed through the slots 18 and 20 of the standards 17 and the hanger-bars 19 respectively, said bolts being provided with wing-nuts 22 and, as thus described, it will be seen that the rear ends of the hanger-bars may be swung away from the platform 10 to a distance complemental to the length of the slots 18 of the standards 17 and the latter locked to said hanger-bars by means of manipulating the wing-nuts 22 and for purposes later described.

The yokes 19 are each approximately of elongated C-shape in plan, as best shown in Figure 1, and each of said bars is provided with an oppositely disposed leg portion 19', said leg portions and their respective bars being joined together by an integral cross bar 23.

Between and through each arm or leg 19 and its said portion 19', an axle bolt 24 is provided.

Wheels 25 are respectively and axially disposed on the bolts 24 for revolvable movements and, as thus described, it will be seen that at times when the rear ends of the hanger-bars 19 are moved away from or close to the platform 10 and locked in a selected position, that said platform is correspondingly raised or lowered for maintaining the platform a selected distance above the soil for the purposes of causing a later described cutter bar to be spaced above said soil a selected distance complemental to the type of work encountered.

At the rear end of the platform, rail supports 25 are oppositely disposed and secured thereto and a steering handle 26 is secured between and at the rear upper ends of said rail supports.

Approximately medially of the platform 10 and adjacent the forward end thereof, a journal box 27 is secured thereto and at a right angle with respect to said platform.

A shaft 28 is disposed through the vertically disposed bearing or box 27, the upper end of the shaft being provided with a grooved pulley wheel 29.

Adjacent the rear end of the platform, an internal combustion engine 30 is secured thereto, said engine having a grooved pulley 31 driven by its crank shaft.

Between the pulleys 31 and 29, an endless belt 32 is reeved over said pulleys for driving the shaft 28 at all times when the engine 30 is operating.

Figure 4:
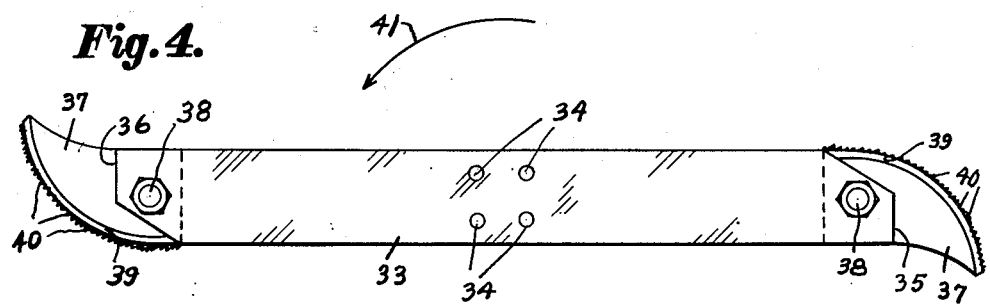
Figure 4 is a top plan view of a rotor bar employed having a cutter of the present invention pivotally attached to each end thereof.

The lower end of the shaft 28 extends below the platform 10 and is secured to a cutter-bar 33. As shown in Figure 4, the cutter-bar is provided with a plurality of apertures 34 midway between its ends for receiving bolts, rivets or the like for attaching the cutter-bar to the lower end of the shaft 28.

Figure 5:
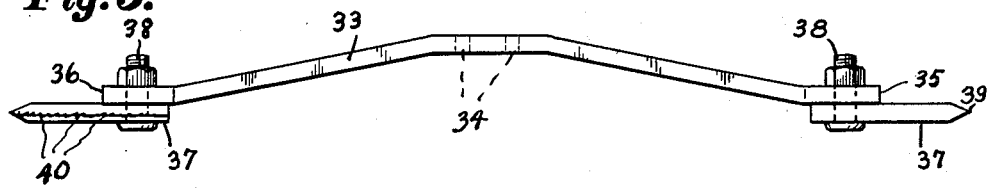
Figure 5 is a side view of the parts shown in Figure 4.

As best shown in Figure 5, the cutter-bar 33 is upwardly arched with respect to the oppositely disposed ends 35 and 36 thereof during use. Like cutters 37 are pivotally attached respectively to the ends 35 and 36 of the cutter-bar 33 by means of bolts 38.

Each cutter 37 is provided with a cutting edge 39 which, as best shown in Figure 4, is provided with minute serrations 40 for purposes later described. The serrations 40 protrude outwardly from the blade in the direction of rotation of the blade. The cutting edges 39 are arcuate in plan and since, during use, the bar 33 revolves in the direction of the arrow 41, the serrations 40 of the cutting edges 39 are gradually presented to the work since the curvature of the cutting edges 39 is normally disposed sloped in a direction opposite to the direction of the rotation of the cutter-bar 33.

At times when the engine causes the shaft 28 to rotate at approximately 800 revolutions per minute, the outer ends 35 and 36 of the cutter-bar 33 are caused to travel circularly at comparatively high speed, whereby, since the cutters 37 are pivotally attached to said ends of the cutter-bar respectively and since the major portion of the weight of the cutters 37 is disposed to one side of their pivotal mountings 38, centrifugal force causes the cutters to align with the longitudinal axis of the cutter-bar 33, approximately as shown in Figure 4, and to an operative cutting position.

Referring to Figure 1, the engine 30 is mounted rearwardly of the platform and rearwardly of the axles 24, whereby the weight of said engine approximately counter-balances the weight of the forward end of the platform together with the mechanism disposed on said forward end and for preventing the cutters from engaging with the soil during revolvable movement of the bar 33, a hook-like guard 42 is secured to the forward end of the platform.

As best shown in Figure 2, the hook-like guard 42 is looped forwardly and downwardly and bent towards the rear end of the platform whereby at times when the hook-like guard 42 strikes a solid object such as a tree, the machine is prevented from traveling further towards said tree and also said hook-like guard prevents the forward end of the platform from swinging downwardly towards the soil unduly for preventing the cutters 37 from contact with said soil and from a damaging contact with solid debris lodged on said soil.

As thus described, it will be seen that the height of the cutters above and with respect to the soil, may be regulated by manipulation of the wing-nuts 22 for operating upon short grasses or weeds as may be desired.

During revolvable movements of the cutter-bar 33, the cutters operate similar to a saw for severing the coarse, tough fibers of weeds and it will be noted that this operation is possible since, as shown in Figure 1, during each revolution of the cutter-bar 33, each cutter projects forwardly of the forward end of the platform 10 since the latter is semi-elliptical in plan for the said purpose, said cutters being disposed or retiring under a side edge of the platform during the travel of the bar 33 and outwardly of the other side edge of said platform during said travel, said retirement being gradual since the position of the shaft 28 is medial with respect to said side edges of the platform and closer to the forward edge portion "A" of said platform than to said sides of the platform. By this means, either short grasses or tall weeds which extend above the platform may be readily severed.

In the event that one of the cutters contacts with a solid object such as a fence post or the like during the forward travel of the machine, it will be noted that the arcuate ends of the cutters 37 will swing or fold on their pivots toward the shaft 28 and into a non-operative position, whereby the edges of the cutters and especially the minute serrations 40 of said edges are protected from becoming damaged or dulled unduly.

The new device further includes a guard 43 which, as shown in Figure 2 and as shown by the dotted lines in Figure 1, is transversely disposed across and under the platform rearwardly of the cutters, whereby should any of the material clipped by the cutters become cast rearwardly, said material will contact with the guard 43 and fall to the ground and this is of advantage for protecting the ankles and shoes of the operator at times when the latter is manipulating the handle 26 for pushing the machine forwardly.

Since the wheels 25 are disposed for revolvable movements within their respective recesses 12 and 13 and inwardly of the side edges of the platform 10, each of said wheels travels on cut work or soil during forward movement of the machine, whereby said wheels do not become snagged with the stalks of upstanding weeds.

Figure 3:
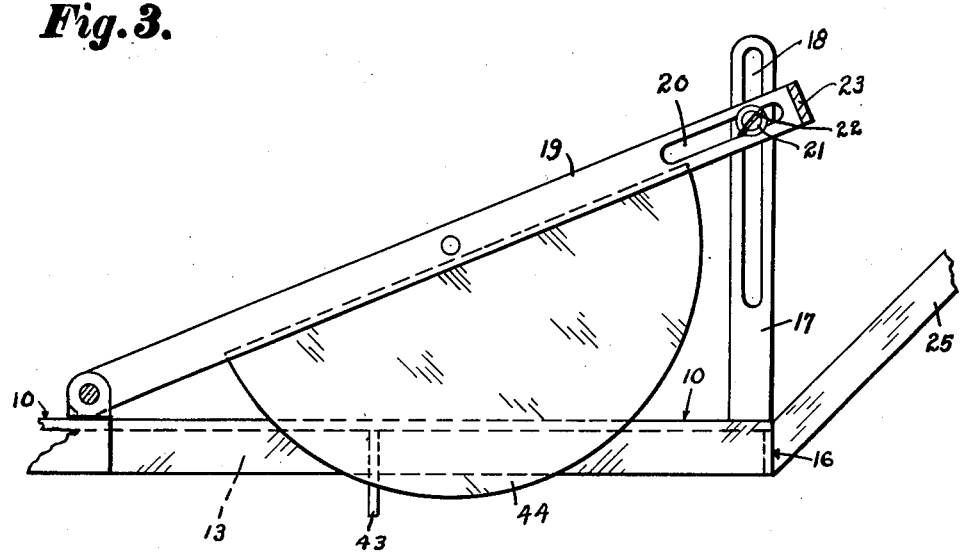
Figure 3 is a vertical section of a portion of the mower, the view being taken substantially on line 3—3 of Figure 1.

Preferably, a semi-circular disc 44 is attached to each hanger-bar 19, as best shown in Figure 3. The discs 44 prevent debris such as sticks and the like cast from the revolving cutters, from breaking the spokes of the wheels. Also, the air-cooled engine is protected by said discs, since the discs prevent grass cuttings moved upwardly by the wheels from becoming sucked and lodged against the screen which covers the cooling fins of the air-cooled engine and since the spokes of the wheels carry grass upwardly, together with clippings, during a forward travel of the machine, said debris is prevented by said guard-discs 44 from hindering the operation of the engine and the belt 32 with respect to the pulley 31.

From the foregoing description, it is thought to be obvious that a mower for fence lines constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

1. In a horizontally rotatable blade mower, the combination which comprises a horizontally disposed platform having an arcuate forward end and having elongated wheel receiving recesses extended inwardly from the rear end and positioned in the sides thereof, rectangular-shaped upwardly inclined yokes having parallel arms connected by cross bars at the rear positioned above the platform, transversely disposed pins pivotally mounting the yokes through the forward ends thereof to the upper surface of the platform at points intermediate of the length of the platform and positioned at the forward ends of the said wheel receiving recesses in the sides thereof, wheels journaled in the arms of said yokes and positioned in the recesses of the platform with the lower parts of the wheels extended below the platform, the inner arms of the said yokes having elongated slots therein, vertically disposed standards extended upwardly from the rear end of the platform and positioned at the inner sides of the yokes, bolts adjustably connecting the yokes to the standards, a handle extended upwardly from the rear end of the platform, a centrally positioned vertically disposed bearing mounted on the forward part of the platform, a vertically disposed shaft journaled in said bearing and positioned with the lower end of the shaft extended below the platform, an arched cutter bar having blades bolted to the ends thereof carried by the lower end of the shaft, and a motor mounted on the platform and operatively connected to the upper end of the shaft.

2. In a horizontally rotatable blade mower, the combination which comprises a horizontally disposed platform having an arcuate forward end and having elongated wheel receiving recesses extended inwardly from the rear end and positioned in the sides thereof, rectangular-shaped upwardly inclined yokes having parallel arms connected by cross bars at the rear positioned above the platform, transversely disposed pins pivotally mounting the yokes through the forward ends thereof to the upper surface of the platform at points intermediate of the length of the platform and positioned at the forward ends of the said wheel receiving recesses in the sides thereof, wheels journaled in the arms of said yokes and positioned in the recesses of the platform with the lower parts of the wheels extended below the platform, the inner arms of the said yokes having elongated slots therein, vertically disposed standards also having elongated slots therein extended upwardly from the rear end of the platform and positioned at the inner sides of the yokes, bolts adjustably connecting the yokes to the standards, semi-circular guard plates carried by the said inner arms of the yokes, extended downwardly therefrom, and positioned to correspond with the lower parts of the wheels, a handle extended upwardly from the rear end of the platform, a centrally positioned vertically disposed bearing mounted on the forward part of the platform, a vertically disposed shaft journaled in said bearing and positioned with the lower end thereof extended below the platform, an arched cutter bar having blades on the ends thereof carried by the lower end of the shaft, a motor mounted on the platform and operatively connected to the upper end of the shaft, a vertically positioned transversely disposed guard plate extended downwardly from the platform and spaced rearwardly from the cutter bar, and a hook-like guard extended from the forward end of the platform and positioned to protect the blades of the said cutter bar.

GARLAND L. FREEMAN.

REFERENCES CITED

The following references are of record in the file of this patent:

UNITED STATES PATENTS

| Number | Name | Date |
|---|---|---|
| 1,569,987 | Lamberti | Jan. 19, 1926 |
| 1,784,327 | Allen | Dec. 9, 1930 |
| 1,793,353 | Benson | Feb. 17, 1931 |
| 1,868,918 | Schenk | July 26, 1932 |
| 1,950,472 | Bowers | Mar. 13, 1934 |
| 2,200,368 | Iverson | May 14, 1940 |
| 2,203,198 | Junge | June 4, 1940 |
| 2,312,972 | Orr | Mar. 2, 1943 |

FOREIGN PATENTS

| Number | Country | Date |
|---|---|---|
| 415,450 | Great Britain | Aug. 27, 1934 |
| 107,917 | Australia | July 6, 1939 |